United States Patent [19]
Atia et al.

[11] Patent Number: 5,990,474
[45] Date of Patent: Nov. 23, 1999

[54] NEAR FIELD OPTICAL PROBE FOR SIMULTANEOUS PHASE AND ENHANCED AMPLITUDE CONTRAST IN REFLECTION MODE USING PATH MATCHED DIFFERENTIAL INTERFEROMETRY AND METHOD OF MAKING IT

[76] Inventors: Walid A. Atia, 10841 Willow Run Ct., Potomac, Md. 20854; Saeed Pilevar, 119 Lamont La., Gaithersburg, Md. 20878; Christopher C. Davis, 6400 Grason Ter., Bowie, Md. 20715

[21] Appl. No.: 08/856,502

[22] Filed: May 14, 1997

Related U.S. Application Data

[60] Provisional application No. 60/016,650, May 15, 1996.

[51] Int. Cl.$^6$ ................................. H01J 3/14; H01J 5/16
[52] U.S. Cl. ........................... 250/234; 250/306; 250/216
[58] Field of Search .......................... 250/216, 234–236, 250/306, 307, 309, 310; 385/12; 356/356

[56] References Cited

U.S. PATENT DOCUMENTS

| | | |
|---|---|---|
| 4,917,462 | 4/1990 | Lewis et al. . |
| 5,237,630 | 8/1993 | Hogg et al. . |
| 5,254,854 | 10/1993 | Betzig . |
| 5,272,330 | 12/1993 | Betzig et al. . |
| 5,286,970 | 2/1994 | Betzig et al. . |
| 5,286,971 | 2/1994 | Betzig et al. . |
| 5,288,996 | 2/1994 | Betzig et al. . |
| 5,288,997 | 2/1994 | Betzig et al. . |
| 5,288,998 | 2/1994 | Betzig et al. . |
| 5,288,999 | 2/1994 | Betzig et al. . |
| 5,294,790 | 3/1994 | Ohta et al. . |
| 5,361,314 | 11/1994 | Kopelman et al. . |
| 5,361,383 | 11/1994 | Chang et al. . |
| 5,367,583 | 11/1994 | Sirkis . |
| 5,371,588 | 12/1994 | Davis et al. . |
| 5,382,789 | 1/1995 | Aoshima . |
| 5,389,779 | 2/1995 | Betzig et al. . |
| 5,410,151 | 4/1995 | Buckland . |
| 5,473,157 | 12/1995 | Grober et al. . |
| 5,485,536 | 1/1996 | Islam . |
| 5,546,223 | 8/1996 | Lewis . |
| 5,548,113 | 8/1996 | Goldberg et al. . |

*Primary Examiner*—Stephone B Allen
*Attorney, Agent, or Firm*—Watson Cole Grindle Watson P.L.L.C.

[57] ABSTRACT

A probe includes first and second single-mode optical fibers with a semi-reflecting mirror between them. The second optical fiber is tapered by heating and pulling. The semi-reflecting mirror, the tapered portion, and the sample form a Fabry-Perot cavity. The probe can be used in a system having a differential interferometer which provides the appropriate path difference with a mirror on a piezoelectric transducer.

16 Claims, 3 Drawing Sheets

NEAR FIELD OPTICAL PROBE FOR SIMULTANEOUS PHASE AND ENHANCED AMPLITUDE CONTRAST IN REFLECTION MODE USING PATH MATCHED DIFFERENTIAL INTERFEROMETRY AND METHOD OF MAKING IT

REFERENCE TO RELATED APPLICATION

This application claims the benefit of U.S. provisional application No. 60/016,650, filed May 15, 1996, the disclosure of which is hereby incorporated by reference.

FIELD OF THE INVENTION

The present invention is directed to a near field optical probe that can simultaneously measure a pure phase and provide enhanced amplitude contrast when operated in reflection mode.

DESCRIPTION OF RELATED ART

As described in the literature, near field scanning optical microscopy (NSOM) is a microscopic imaging technique capable of nanometric resolution combined with all the advantages of conventional optical microscopy, including noninvasiveness, ambient measurement, and high contrast. Operation in reflection mode involves the use of a subwavelength-sized probe which is used as both a source and a detector in a scanning microscopy arrangement. This technique allows the entire system to be in-fiber, greatly simplifying the arrangement and eliminating the effects of mechanical instability inherent in bulk optics. It also allows for imaging of both transparent and opaque samples. Furthermore, because the double pass through the probe's aperture effectively reduces the collected spot size, the reflection mode can potentially achieve better resolution than transmission mode, which to date has achieved a resolution of ~12 nm (limited by the skin depth of the probe's metallic coating).

However, one major drawback of reflection mode which has limited its use is the received low light level which greatly reduces the signal to noise ratio (S/N) as compared with transmission mode. Current NSOM probes are designed to measure only the intensity of light scattered from a sample so as to convert the scattered evanescent field into a propagating one and thereby observe the sample induced intensity changes. The spatial resolution of such a probe is not limited by the classical diffraction limit of $\sim\lambda/2$; instead, the resolution is limited by the size of the probe's aperture, provided that the probe is maintained sufficiently close to the sample. A pure NSOM phase contrast has never been measured due to the difficulty in separating intensity information from phase information. However, a hybrid phase contrast has been measured in transmission mode and in reflection mode, but these measurements were clearly dominated by an intensity contrast and only reveal a small differential phase contrast.

Furthermore, as the near field probe must stay very close to the sample (tens of nanometers) for high resolution, a phase contrast may allow a new type of distance regulation mechanism. The current distance regulation mechanism of choice is the so-called shear force technique, which is a variation of atomic force microscopy. This technique has many disadvantages, including scanning speed limitations, non-constant optical height maintenance, and humidity dependency. Because the probe is constantly being vibrated at its resonance, resolution is immediately limited by the probe's vibrational displacement. The atomic force decay time, which is related to the Q of the probe's resonance, severely limits the scanning speed. Also, the walls of the sample interact with the shear force, causing significant deviations in the tip-sample distance.

Previous attempts to use a constant phase relationship for distance regulation used interference between the light rejected from within the probe and the light reflected by the sample. One far field arrangement involved vibrating the surface slightly and maintaining the received modulated signal at a null via feedback to a piezoelectric transducer (PZT), i.e., always maintaining the interferometer in-phase. This has the advantage of allowing a phase contrast independent of reflectivity while simultaneously recording the amplitude of the signal.

However, for near field imaging, this arrangement is not feasible for several reasons. First, for an adiabatically tapered probe (necessary to reach deep crevices within a sample), the reference signal is extremely small, often smaller than the collected signal reflected from the sample; this results in an extremely poor S/N, and because a coherent source is used, great care is required to assure that no parasitic reflections from within the system (e.g. from the couplers) contribute to phase changes. Second, because one is limited to operating on a null, a worst-case operating distance of $\lambda/4$ away from the sample may be required, depending upon the effective phase origin of the reference signal, and a minimum distance of $\lambda/2$ may be necessary if one wishes to operate on a negative null where the shot noise due to the reference signal is at a minimum. As it is necessary to be closer than the diameter of the probe for near field imaging, this minimum operating distance will take the probe away from the near field, severely limiting the resolution. Finally, the received intensity signal in this arrangement is proportional to $(E_R+E_S)^2$, where $E_R$ and $E_S$ are the amplitude of the reference and collected electric fields, respectively. Thus, depending on the value of $E_R$, the received intensity contrast may be nonlinear.

Another attempt to maintain a constant phase relationship for distance regulation involved holding the received intensity constant, but this arrangement has the severe limitation that it is valid only for homogeneous samples and does not differentiate between amplitude and phase contrast. It should also be noted that the probes used for the above phase imaging had sharp discontinuities between the guiding fiber and the tapered region in order to get a usable reference signal, but this may make the probes too wide to scan a typical sample with rough features. Also, it was necessary for the above probes to be used without metal coating in order to yield large enough return signals, a limitation which yields a poorer resolution than with a coated probe.

The gyroscope community, which is interested in measuring extremely small phases changes close to the theoretical limit, discovered some years ago the essential need for a low coherence source. Rayleigh scattering from small inhomogeneities in the fiber core was causing parasitic interference that prevented the required minimum phase chance measurements. They resorted to the use of low coherence sources to overcome these problems and were then able to measure the desired phase changes. To date, reflection near field measurements have been made using a coherent source and thus have been plagued by unwanted interference effects from parasitic reflections within the system (e.g., due to the back-reflection of the couplers or Fresnel reflections at the fiber/air interfaces).

SUMMARY OF THE INVENTION

An object of the invention is to overcome the above-noted deficiencies of the related art by providing a probe whose received intensity signal is dark noise limited out to the shot noise limit via interferometric mixing, while simultaneously allowing the measurement of a pure phase contrast.

Another object of the invention is to provide such a probe which replaces the shear force distance regulation mechanism for appropriate samples.

Still another object of the invention is to provide a near field probe which uses the technique of path matched differential interferometry (PMDI) and allows simultaneous shear-force, intensity, and phase measurement or any combination thereof.

To these and other objects, the present invention is directed to a probe comprising: a first optical body for transmitting light from a light source, the first optical body having an end; a semi-reflective mirror on the end of the first optical body for reflecting a first portion of the light and transmitting the second portion of the light; and a second optical body attached to the semi-reflective mirror for receiving the second portion of the light, the second optical body having a tip for transmitting the second portion of the light out of the second optical body.

The invention is further directed to a probe system for analyzing a sample, the probe system comprising: light source means for emitting light, a probe comprising (i) a first optical body for transmitting the light emitted by the light source means, the first optical body having an end, (ii) a semi-reflective mirror on the end of the first optical body for reflecting a first portion of the light and transmitting the second portion of the light, and (iii) a second optical body attached to the semi-reflective mirror for receiving the second portion of the light, the second optical body having a tip for transmitting the second portion of the light out of the second optical body; stage means for holding the sample so that the second portion of the light is incident on the sample and so that light returned from the sample enters the tip; and analyzing means, receiving the light returned from the sample, for analyzing the light returned from the sample.

The invention is further directed to a method of making a probe, the method comprising: (a) providing a first optical body for transmitting light from a light source, the first optical body having an end; (b) forming a semi-reflective mirror on the end of the first optical body for reflecting a first portion of the light and transmitting the second portion of the light; and (c) splicing a second optical body to the semi-reflective mirror for receiving the second portion of the light, the second optical body having a tip for transmitting the second portion of the light out of the second optical body.

If the probe according to the present invention is used to maintain a constant phase reference of the received signal, distance regulation can be maintained without the need to vibrate the probe and while maintaining a constant optical height. Scanning speed can be made real-time, allowing a new look into the realm of biological interactions on the molecular scale; i.e., real-time movies can be made of specific interactions. However, it should be emphasized that near field distance regulation using a constant phase reference is particularly suited to a dielectric sample, for which biological samples may qualify. In complex dielectrics (e.g. metallic samples), significant phase changes not related to sample topography will occur upon reflection from the sample because in this case the reflection coefficient is complex. Phase distance regulation can be used in these samples if the entire sample is coated with the same material, in which case a constant static phase change upon resection will not affect the constant phase relationship.

A pure phase modality will achieve a unique contrast from intensity which may prove invaluable for the study of certain specimens, such as biological samples or integrated circuits.

BRIEF DESCRIPTION OF THE DRAWINGS

An exemplary embodiment of the invention will now be described in detail with reference to the drawings, in which.

DETAILED DESCRIPTION OF THE PREFERRED EMBODIMENT

A probe comprising a partially reflecting mirror immediately before the tapered region is used to create a strong reference beam for interferometric mixing. The probe is fabricated in the manner shown in FIGS. 1A–1D.

Figure 1A:
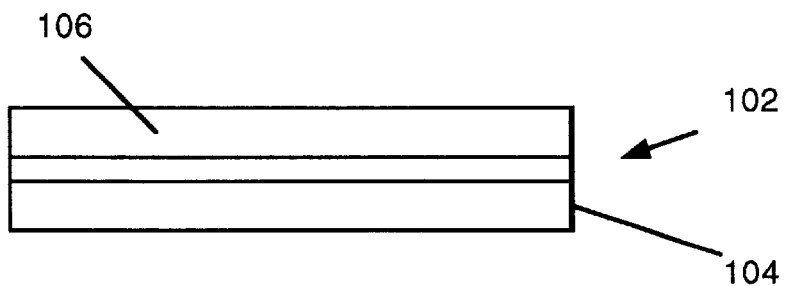
FIG. 1A shows an optical fiber and a mirror formed thereon after a first stage in a method of making a probe according to the invention.

First, as shown in FIG. 1A, semi-reflective mirror 102 is made by evaporating a low absorption coating onto end 104 of cleaved single-mode optical fiber 106. The coating can be a dielectric material such as $TiO_2$ or a highly reflective, low absorbing metal such as gold.

Figure 1B:
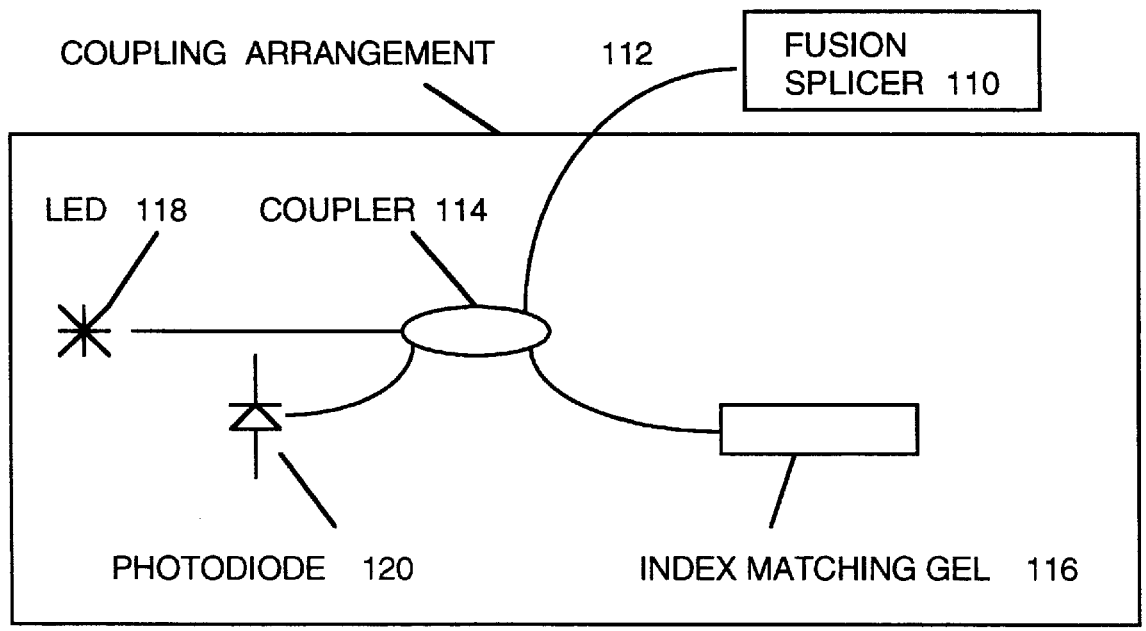
FIG. 1B shows a setup used in a second stage in the method of making the probe according to the invention.
Figure 1E:
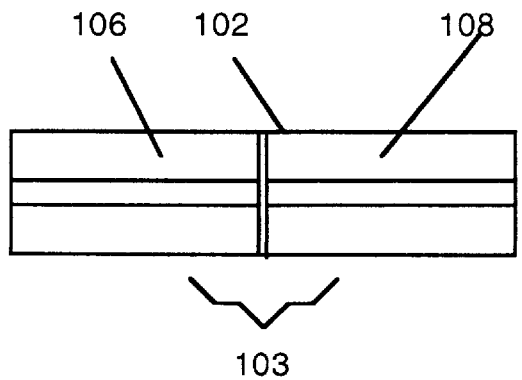
FIG. 1C shows a third stage in the method of making the probe according to the invention.
FIG. 1D shows a completed probe according to the invention.

As shown in FIG. 1B, a semi-reflecting mirror within the fiber can be made by splicing another single-mode fiber 108 to the mirrored end via fusion splicer 110 to form splice 103. The reflectivity of semi-reflective mirror 102 in splice 103 can be adjusted during the splicing process by monitoring the reflected output in a 3-dB coupling arrangement 112 while applying a variable number of arcs. The coupling arrangement 112 includes coupler 114 supplied with index-matching gel 116. The coupling arrangement 112 allows light from LED 118 to be made incident on mirror 102 and for light reflected by the mirror to be detected by photodiode 120.

For optimal fringe visibility, the mirror should be made to yield a return signal equal to that of the signal that will be reflected from the sample and collected by the tip. Additionally, one should make the mirror sufficiently reflective in order interferometrically to bring a dark noise limited sample received signal into the shot noise limited regime. Thus, for certain types of samples, different reflectivities will create an optimal probe. Those skilled in the art will be able to derive the appropriate reflectivities for their intended purposes.

Figure 1C:
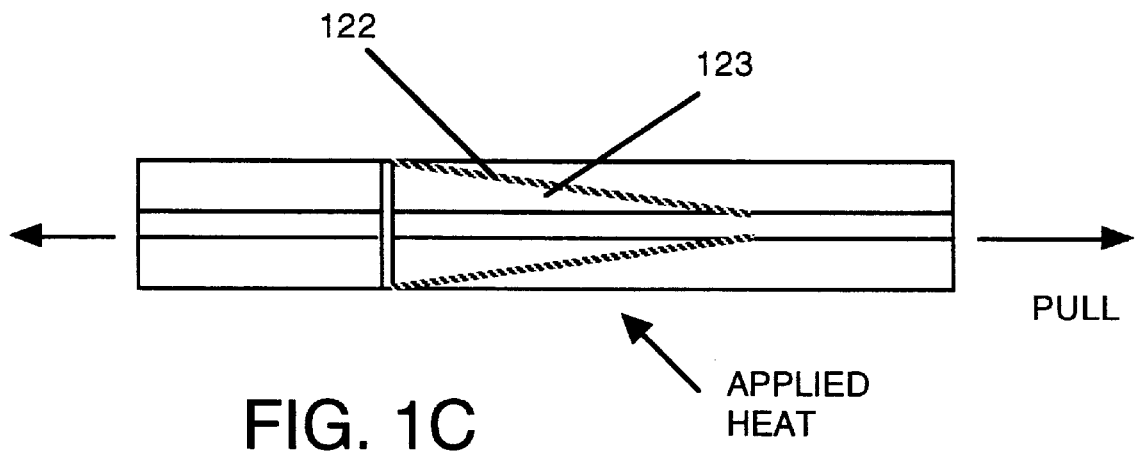
Figure 1D:
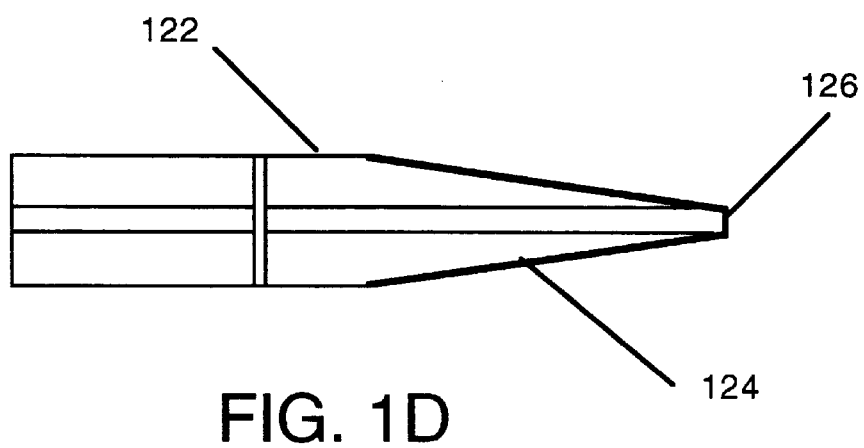

After the desired reflectivity is obtained, the fusion splicer 110 can then be used to taper the fiber, to form probe 122 having tapered portion 123, as shown in FIG. 1C. This has the advantage of allowing an easily reproducible cavity length by using the fusion splicer's stepper motors. The taper is made close to the end of the splice, as shown in FIG. 1C, so that the only region of the interferometer which is not common-path is made negligibly short. The result is a Fabry-Perot cavity region, shown in FIG. 2 as 201, including the reflective mirror and sample 204. Alternatively, a pipette puller and $CO_2$ laser can be used, combined with a microscope objective illuminating some ruled lines in order to get repeatable cavity lengths. See U.S. Pat. No. 5,286,970, the teachings of which are incorporated herein by reference.

If desired, metal coating 124 may be evaporated on the sides of the probe. It is not essential to coat probe tip 126 for subwavelength resolution, but the coating 124 may reduce side coupling into the fiber by blocking light penetration from the sides and thus improve resolution. The coating 124 will not affect the reference beam of the interferometer. The reduction of side coupling may also be achieved through modulation by vibrating the sample relative to the tip laterally, longitudinally, or both at a distance of approximately the tip diameter, so that the main component of the light which is modulated will be that at the end of tip 126.

One implementation of a system using near field probe 122 as made in the manner described above is shown in FIG. 2, where system 200 accomplishes optical phase detection using path matched differential interferometry (PMDI). In a PMDI system such as system 200, low coherence light source 202 is used to illuminate sample 204 on XYZ PZT stage 206 through probe 122. The XYZ PZT stage is so called because it can move in three dimensions (x, y, and z). Because the coherence length is shorter than the cavity length formed by the taper, no interference is created within the taper.

Low coherence light source 202 includes LED 208. Light emitted by the LED passes through mode stripper 210 and coupler 212 supplied with index-matching gel 214 to the probe. The mode stripper 210 strips out modes that are not to be transmitted through fiber 106, which, as noted above, is a single-mode fiber. Of course, if a different kind of optical fiber is used, the mode stripper may not be necessary.

To recover phase information, the light returning from tapered portion 123 is carried by coupler 212 to demodulating interferometer 216 whose path difference is made to approximately equal the length of tapered portion 123 to within the coherence length of the source. Thus, the static phase term can be set to any desired value regardless of the cavity length. Such an arrangement overcomes the aforementioned drawback of a minimum probe sample separation.

Figures 2, 2A:
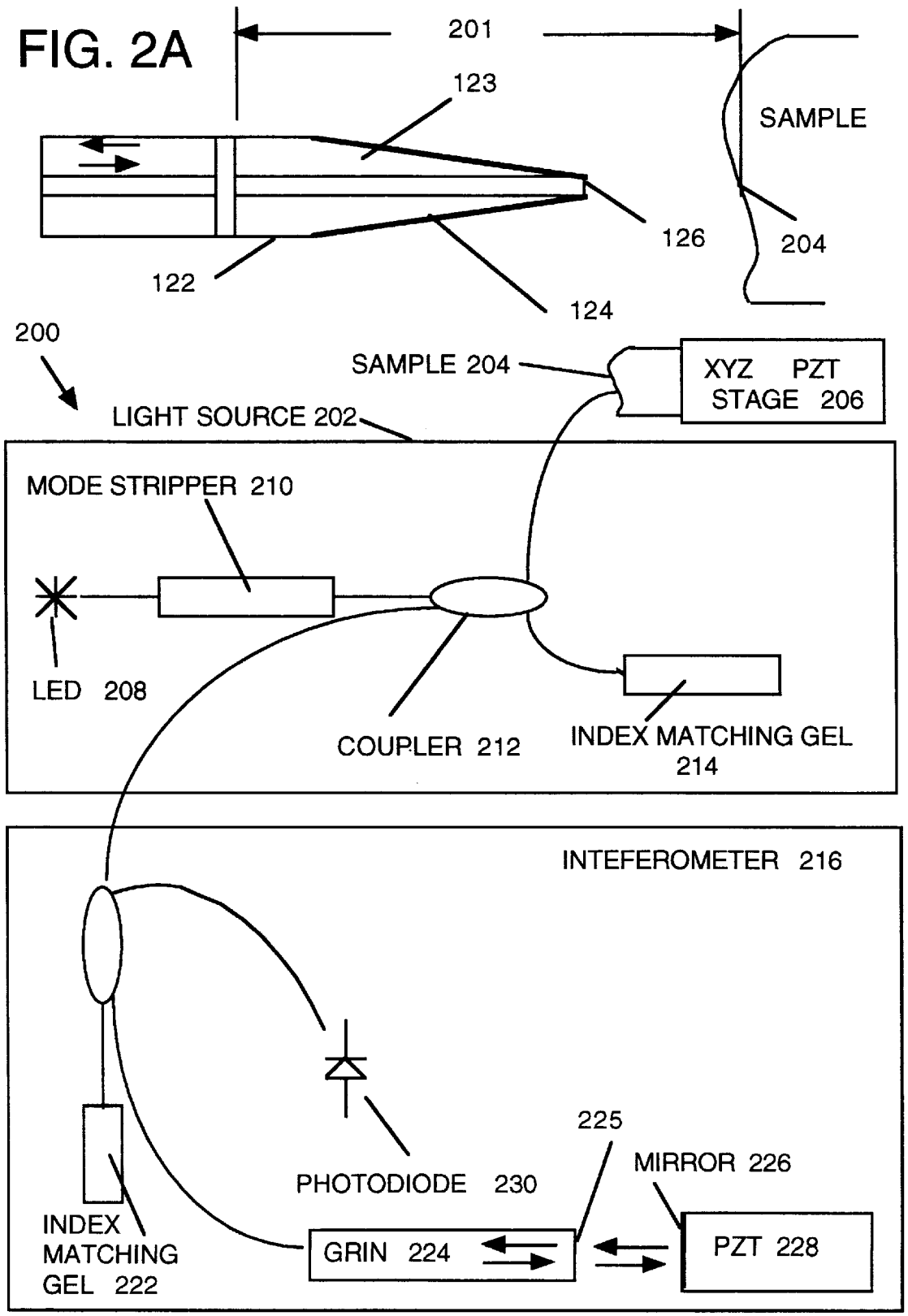
FIG. 2 shows a PMDI system incorporating the probe of FIG. 1D.

As shown in FIG. 2, demodulating interferometer 216 includes coupler 220 supplied with index-matching gel 222, collimating graded-index (GRIN) lens 224 and mirror 226 mounted on piezoelectric transducer (PZT) 228. Light reflected by the mirror passes back through coupler 220 to photodiode 230.

A two-beam interferometer is formed between the light reflected from the GRIN lens/air interface 225 and the light reflected by the mirror. The PZT can then be modulated at a desired sinusoidal frequency to create a pseudoheterodyne carrier signal Herein lies the advantage of the PMDI arrangement. Coherent heterodyne detection can be achieved without the need for expensive and bulky acousto-optic modulators and complex RF demodulating electronics. Furthermore, unlike the heterodyne arrangements which can measure only AC phase shifts, the PMDI arrangement according to the invention allows for simple measurement of static phase shifts essential for distance regulation. Finally, except for the small tapered region, the entire interferometer is common-path, virtually eliminating any environmentally induced phase perturbations.

Another advantage of using a low coherence source is that the only interference effect observed is the desired interference between the reference beam and the signal beam reflected from the sample. These undesired reflections are not common path, so environmental perturbations can severely degrade the S/N. When a low coherence source is used, interference effects from parasitic reflections are eliminated because they fall outside the coherence length of the source. Thus, unwanted reflections contribute only to a fixed background intensity level.

Past attempts to reduce the parasitic reflections involved the use of wedges or angler cleaves for launching light into the fiber. This resulted in a loss of signal coupling to the fiber reducing the S/N. Current pig-tailed, high power low coherence sources called super luminescent diodes can deliver more power than a single mode He—Ne laser source and are inherently quieter and more stable than their laser counterparts.

Using the PMDI modulation arrangement described above, the probe can enhance the amplitude of the received signal and simultaneously obtain a pure phase contrast using a suitable demodulation technique. One technique to do this involves modulating the PZT of the receiving interferometer at a frequency of $\omega_s$ and with amplitude $A_s$ chosen to maximize the first harmonic, so that the detected intensity I is $$I = E_R^2 + E_S^2 + 2 E_R E_S \cos(A_s \sin \omega_s t + \phi_0), \quad (1)$$

where $E_R$ is the reference electric field reflected from the in-fiber mirror, $E_S$ is the signal reflected from the sample and transmitted back through the mirror, and $\phi_0$ represents an environmentally insensitive static phase term. Expanding the interference signal yields $$2E_R E_S \cos(A_s \sin \omega_s t + \phi_0) = \quad (2)$$
$$2E_R E_S [\cos \phi_0] [J_0(A_s) - 2J_2(A_s) \sin(2\omega_s t) + \ldots] -$$
$$2E_R E_S [\sin \phi_0] [2J_1(A_s \sin \omega_s t - 2J_3(A_s) \sin(3\omega_s t) + \ldots],$$

where $J_n$ is the nth order Bessel function. Detecting the amplitude of the second harmonic signal at $2\omega_s$ and forcing this error signal to zero by feedback to the PZT of the demodulating interferometer will set $\cos \phi_0 = 0$; i.e., the interferometer will always be held in quadrature. As a scan is made, the feedback voltage signal will correspond to the change in phase of the signal reflected from the sample. This can be done while simultaneously using shear force distance regulation. Alternatively, one can implement phase distance regulation instead of shear force by feedback of the error signal directly to the sample PZT.

While the interferometer is held in quadrature, an enhanced amplitude signal can be coherently detected at the modulation frequency $\omega_s$. This signal has an amplitude of $4E_R E_S J_1(A_s)$ which is an enhancement of $2E_R/E_S$ over the usually detected $E_S^2$ signal. This boost in the amplitude can bring a dark current limited signal into the shot noise limit, dramatically improving the S/N. Thus, reflection mode NSOM using a coated probe, previously impractical due to the tiny received light levels, can be made feasible. If desired, a small sinusoidal vibration of the sample can also be applied to enhance the near field reflected signal, where the vibration frequency will be seen as a carrier sideband. If one is interested only in boosting the amplitude signal, an open loop demodulation arrangement which is insensitive to phase changes can be realized.

Several variations of the above system can be used. The demodulating interferometer can be replaced by an unbalanced integrated optic chip to eliminate the mechanical instability of the PZT mirror stage and to increase the possible bandwidth of the system. Alternatively, a frequency modulated laser diode source can be used to create a pseudoheterodyne carrier. In this arrangement, no demodulating interferometer is necessary because the source is coherent. The phase of the interferometer can bet maintained at a constant reference by changing the DC current to the diode which proportionally changes the center frequency. However, because the cavity length of the probe is very short, a carrier of sufficient depth of modulation may not be attainable with the limited tunability of current laser diodes. Nonetheless, improvements in laser diodes should remove this difficulty.

Other reflecting in-fiber components, such as a Bragg grating, can be used to obtain a strong and clearly defined reference signal. Also, for a particular tip, an approach curve can be made while using shear force damping as a reference to identify a particular fringe for near field separation. After this calibration procedure, phase distance regulation can be used by locking on the desired fringe corresponding to near field detection.

The disclosed system comprising the tapered fiber probe with a partially reflecting mirror immediately preceding the taper and the interferometric arrangement can therefore be used to measure an enhanced amplitude and a pure phase contrast. This system is attractive because it allows for a high S/N in reflection mode NSOM and permits a previously unexplored phase contrast which may reveal a new type of sample information. The phase and amplitude measurements can be made while using shear force distance regulation, or a phase reference may be used for distance regulation in appropriate samples. The system according to the present invention can be made with commercially available materials and requires only moderate skill level to assemble.

An alternative embodiment exists in which the entire structure may be fabricated using micromachining techniques (i.e., semiconductor device fabrication technology). For example, the tapered optical fiber can be replaced by a tapered optical waveguide structure made from silicon, and the partially reflecting mirror can be formed through a fabrication step on the mask. This would allow for mass production of the structure with highly reproducible features.

Other variations of the present invention will be apparent to those skilled in the art who have reviewed this disclosure. The examples given above are not intended to restrict the invention to the specific methods and materials described. Moreover, variations described above can be combined as needed. Therefore, the present invention should be construed as limited only by the appended claims.

We claim:

1. A probe comprising:
   a first optical body for transmitting light from a light source, the first optical body having an end;
   a semi-reflective mirror on the end of the first optical body for reflecting a first portion of the light and transmitting the second portion of the light; and
   a second optical body attached to the semi-reflective mirror for receiving the second portion of the light, the second optical body having a tip for transmitting the second portion of the light out of the second optical body.

2. A probe as in claim 1, wherein:
   the first optical body comprises a first optical fiber; and
   the second optical body comprises a second optical fiber.

3. A probe as in claim 2, wherein each of the first optical fiber and the second optical fiber is a single-mode optical fiber.

4. A probe as in claim 3, wherein the second optical fiber comprises a tapered portion which has a wider end between the semi-reflective mirror and the tip and a narrower end at the tip.

5. A probe as in claim 4, further comprising a coating on the tapered portion.

6. A probe as in claim 1 wherein the first and second optical body each comprise a solid state optical waveguide and the semi-reflective mirror is formed on the second optical body.

7. A probe system for analyzing a sample, the probe system comprising:
   light source means for emitting light;
   a probe comprising (i) a first optical body for transmitting the light emitted by the light source means, the first optical body having an end, (ii) a semi-reflective mirror on the end of the first optical body for reflecting a first portion of the light and transmitting the second portion of the light, and (iii) a second optical body attached to the semi-reflective mirror for receiving the second portion of the light, the second optical body having a tip for transmitting the second portion of the light out of the second optical body;
   stage means for holding the sample so that the second portion of the light is incident on the sample and so that light returned from the sample enters the tip; and
   analyzing means, receiving the light returned from the sample, for analyzing the light returned from the sample.

8. A probe system as in claim 7, wherein:
   the first optical body comprises a first optical fiber; and
   the second optical body comprises a second optical fiber.

9. A probe system as in claim 8, wherein each of the first optical fiber and the second optical fiber is a single-mode optical fiber.

10. A probe system as in claim 9, wherein the second optical fiber comprises a tapered portion which has a wider end between the semi-reflective mirror and the tip and a narrower end at the tip.

11. A probe system as in claim 10, further comprising a coating on the tapered portion.

12. A probe system as in claim 7, wherein the light source means comprises:
    light generating means for generating the light; and
    first coupling means for (i) causing the light generated by the light generating means to be incident on the first optical body and (ii) directing the light returned by the sample to the analyzing means.

13. A probe system as in claim 12, wherein the analyzing means comprises a demodulating interferometer.

14. A probe system as in claim 13, wherein:
    the second optical body comprises a tapered portion which has a wider end between the semi-reflective mirror and the tip and a narrower end at the tip; and
    the demodulating interferometer has a path difference which is approximately equal to a length of the tapered portion to within a coherence length of the light generated by the light generating means.

15. A probe system as in claim 13, wherein the demodulating interferometer has a path difference and comprises means for sinusoidally varying the path difference.

16. A probe of claim 1 wherein the first and second optical body each comprise a solid state optical waveguide and the semi-reflective mirror is formed on the second optical body.

* * * * *